United States Patent
Sano

(10) Patent No.: US 10,049,273 B2
(45) Date of Patent: Aug. 14, 2018

(54) IMAGE RECOGNITION APPARATUS, IMAGE RECOGNITION SYSTEM, AND IMAGE RECOGNITION METHOD

(71) Applicant: Kabushiki Kaisha Toshiba, Minato-ku, Tokyo (JP)

(72) Inventor: Toru Sano, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 14 days.

(21) Appl. No.: 14/738,434

(22) Filed: Jun. 12, 2015

(65) Prior Publication Data
US 2016/0247022 A1    Aug. 25, 2016

Related U.S. Application Data

(60) Provisional application No. 62/120,219, filed on Feb. 24, 2015.

(51) Int. Cl.
*G06K 9/00* (2006.01)
*G06K 9/68* (2006.01)

(52) U.S. Cl.
CPC ....... *G06K 9/00624* (2013.01); *G06K 9/6814* (2013.01)

(58) Field of Classification Search
None
See application file for complete search history.

(56) References Cited

U.S. PATENT DOCUMENTS

| | | | | |
|---|---|---|---|---|
| 6,115,495 | A * | 9/2000 | Tachikawa | G06K 9/00463 382/165 |
| 8,090,222 | B1 | 1/2012 | Baluja et al. | |
| 8,498,490 | B1 | 7/2013 | Baluja et al. | |
| 8,744,191 | B1 | 6/2014 | Baluja et al. | |
| 8,819,015 | B2 * | 8/2014 | Sato | G06K 9/00281 707/737 |
| 8,837,773 | B2 | 9/2014 | Katano | |
| 9,058,537 | B2 * | 6/2015 | Yoshii | G06K 9/3233 |
| 9,171,013 | B2 * | 10/2015 | Gokturk | G06F 17/30253 |
| 2002/0028001 | A1 * | 3/2002 | Doi | G06T 7/004 382/103 |
| 2006/0110029 | A1 * | 5/2006 | Kazui | G06K 9/00228 382/159 |
| 2006/0204079 | A1 * | 9/2006 | Yamaguchi | G06K 9/4604 382/154 |

(Continued)

FOREIGN PATENT DOCUMENTS

| | | |
|---|---|---|
| JP | 2010-146395 | 7/2010 |
| JP | 2011-248525 | 12/2011 |
| WO | WO 2011/096010 | 8/2011 |

*Primary Examiner* — Shervin Nakhjavan
(74) *Attorney, Agent, or Firm* — Knobbe, Martens, Olson & Bear, LLP

(57) ABSTRACT

An image recognition apparatus in an embodiment includes a feature-value calculating section configured to calculate a feature value in a region of interest segmented from an image, a likelihood calculating section configured to calculate likelihood of an object present in the region of interest referencing the feature value including a plurality of feature value elements and dictionary data including a plurality of dictionary elements, and a dictionary control section configured to acquire the dictionary element corresponding to the feature value element exceeding a set value.

17 Claims, 9 Drawing Sheets

(56) References Cited

U.S. PATENT DOCUMENTS

| | | | |
|---|---|---|---|
| 2008/0304707 A1* | 12/2008 | Oi | G06K 9/00664 382/103 |
| 2009/0041355 A1* | 2/2009 | Sakaji | G06K 9/00255 382/190 |
| 2010/0014758 A1* | 1/2010 | Yano | G06K 9/00228 382/195 |
| 2010/0124358 A1* | 5/2010 | Huang | G06K 9/00342 382/103 |
| 2011/0216977 A1* | 9/2011 | Yu | G06K 9/00228 382/190 |
| 2012/0008866 A1* | 1/2012 | Halimeh | G06K 9/00791 382/190 |
| 2012/0045132 A1* | 2/2012 | Wong | G06K 9/4676 382/195 |
| 2012/0242842 A1* | 9/2012 | Yoshigahara | G06K 9/228 348/207.1 |
| 2013/0083963 A1* | 4/2013 | Okamoto | H04N 5/23212 382/103 |
| 2013/0101223 A1* | 4/2013 | Kawanishi | H04N 5/91 382/195 |
| 2013/0163830 A1* | 6/2013 | Matsushita | G06K 9/00288 382/118 |
| 2013/0216094 A1* | 8/2013 | DeLean | G06K 9/00335 382/103 |
| 2013/0230211 A1* | 9/2013 | Tanabiki | G06K 9/00342 382/103 |
| 2013/0287251 A1 | 10/2013 | Mitsui et al. | |
| 2013/0308868 A1* | 11/2013 | Brown | G06K 9/00369 382/195 |
| 2014/0010450 A1* | 1/2014 | Suwa | G06K 9/00281 382/173 |
| 2014/0010458 A1* | 1/2014 | Nakamura | G06F 17/30244 382/195 |
| 2014/0023241 A1* | 1/2014 | Sugasawa | G06K 9/00624 382/110 |
| 2014/0133745 A1* | 5/2014 | Razavi | G06K 9/00791 382/160 |
| 2015/0139493 A1* | 5/2015 | Takeno | G06K 9/00912 382/103 |

\* cited by examiner

IMAGE RECOGNITION APPARATUS, IMAGE RECOGNITION SYSTEM, AND IMAGE RECOGNITION METHOD

FIELD

Embodiments described herein relate generally to an image recognition apparatus, an image recognition system, and an image recognition method.

BACKGROUND

In recent years, there has been an increasing demand for security cameras and vehicle mounted cameras. As one method for recognizing a target object with a vehicle mounted camera or the like, pattern recognition is used. In the pattern recognition, dictionary data is generated from a feature value of a recognition target object learned in advance. Usually, different dictionary data is generated for each of types of recognition target objects such as a person and a vehicle. Further, a plurality of dictionary data are generated by changing a visual point and a posture of the same type of an object. The object is recognized from photographed images with reference to the plurality of dictionary data generated in this way.

Examples of a representative method of the pattern recognition include a method of recognizing an object referencing an HOG (histograms of oriented gradients) feature value. In this method, a small rectangular region called region of interest (hereinafter referred to as ROI) is set on an image and the HOG feature value is calculated referencing luminance gradient information obtained from pixels included in the ROI. Then, likelihood is calculated from an inner product of the HOG feature value and a plurality of dictionary data prepared in advance. An object included in the ROI is specified by identifying dictionary data having the highest likelihood.

Since there is an enormous amount of dictionary data, a general image recognition apparatus does not include dictionary data inside and reads necessary dictionary data from an external memory or the like every time and performs recognition operation for an object. However, processing efficiency is reduced because a long time is required to acquire the dictionary data from the external memory.

DETAILED DESCRIPTION

An image recognition apparatus in an embodiment includes: a feature-value calculating section configured to calculate a feature value in a region of interest segmented from an image; a likelihood calculating section configured to calculate likelihood of an object present in the region of interest referencing the feature value including a plurality of feature value elements and dictionary data including a plurality of dictionary elements; and a dictionary control section configured to acquire the dictionary element corresponding to the feature value element exceeding a set value.

First Embodiment

Figure 1:
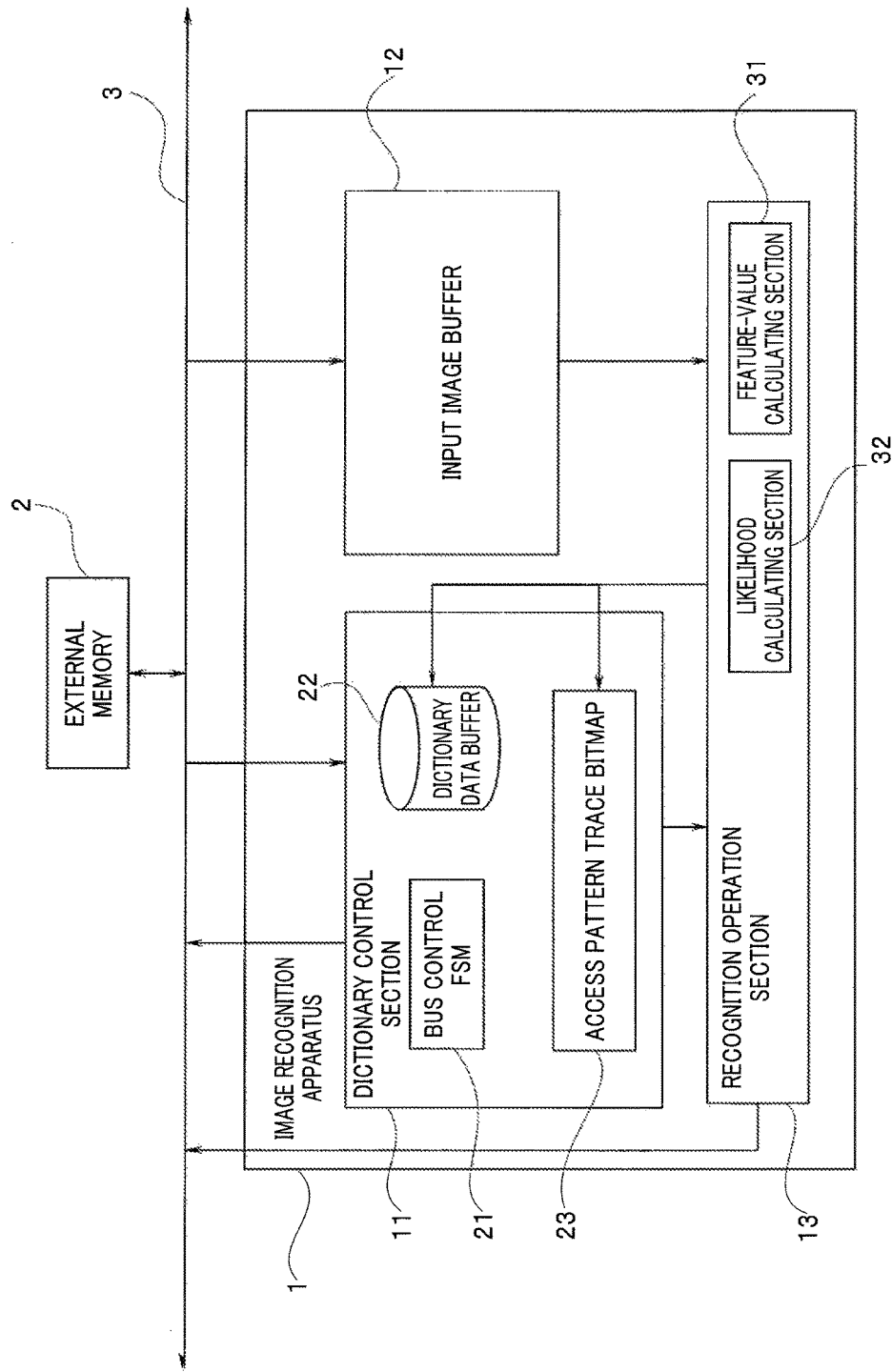
FIG. 1 is a block diagram showing an example of a configuration of an image recognition apparatus 1 according to a first embodiment.

FIG. 1 is a block diagram showing an example of a configuration of an image recognition apparatus 1 according to the present embodiment. The image recognition apparatus 1 specifies a place, a position, a type, and the like of a recognition target object such as a person, a vehicle, or a character in image data obtained from an external input device such as a camera, a broadcast wave, or a network. The image recognition apparatus 1 shown in FIG. 1 includes a dictionary control section 11, an input image buffer 12, and a recognition operation section 13.

The dictionary control section 11 performs control of dictionary data referenced for specifying an object included in image data. The dictionary control section 11 is mainly configured from a bus control finite state machine 21 (hereinafter referred to as bus control FSM 21), a dictionary data buffer 22, and an access pattern trace bitmap 23 (hereinafter referred to as bitmap 23) serving as discrimination data.

In general, a plurality of dictionary data are prepared for each of types of objects such as a person and a vehicle. Note that a plurality of dictionary data are also prepared for the same person according to a direction and the like. Therefore, there are an enormous number of dictionary data for recognizing one object. It is also possible to store all the dictionary data in the image recognition apparatus 1. However, this is unrealistic because a memory having an enormous capacity is necessary and a chip area increases, leading to increases in power consumption and chip costs. Usually the dictionary data is stored in an external memory. In the present embodiment, it is assumed that the dictionary data is stored in an external memory 2 from which the dictionary data can be acquired via a bus 3.

The image recognition apparatus 1 reads one (or a predetermined number of) dictionary data from the external memory 2. When image recognition operation processing (likelihood calculation processing) performed referencing the read dictionary data ends, the image recognition apparatus 1 reads next dictionary data from the external memory. That is, the image recognition apparatus 1 performs image recognition while replacing dictionary data retained inside the image recognition apparatus 1.

The bus control FSM 21 is a state machine for controlling the replacement of the dictionary data. The bus control FSM 21 performs an address calculation and control of a state for requesting dictionary data stored in the external memory 2 and acquiring the dictionary data via the bus 3. The dictionary data buffer 22 temporarily stores the dictionary data acquired from the external memory 2. The bitmap 23 is referenced for identifying a position of a dictionary element referenced for image recognition among a large number of elements (hereinafter referred to as dictionary elements) included in the dictionary data. For example, a 1-bit flag is prepared for each of the dictionary elements. A flag of the dictionary element referenced for the image recognition is set to "1". A flag of the dictionary element not referenced for the image recognition is set to "0".

Figure 2:
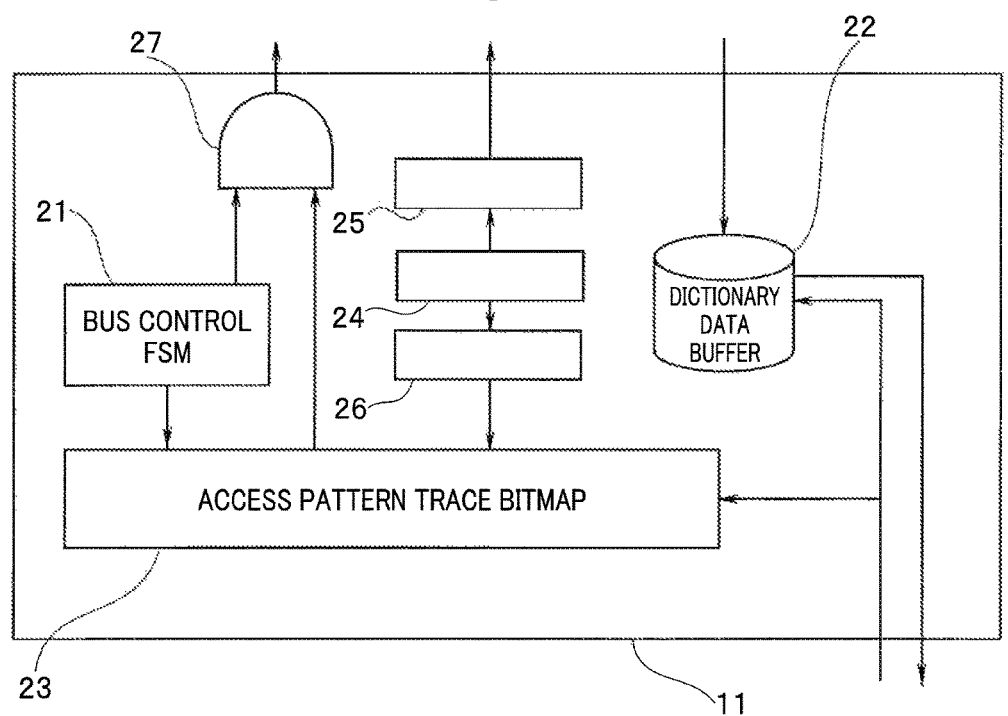
FIG. 2 is a block diagram showing an example of a detailed configuration of a dictionary control section 11 according to the first embodiment.

FIG. 2 is a block diagram showing an example of a detailed configuration of the dictionary control section 11. The dictionary control section 11 shown in FIG. 2 includes, in addition to the bus control FSM 21, the dictionary data buffer 22, and the bitmap 23, a dictionary-element address register 24, a global-address converting section 25, and a bitmap-address converting section 26.

The dictionary-element address register 24 retains an address value of a predetermined dictionary element in the dictionary data buffer 22. The global-address converting section 25 converts a predetermined dictionary element address in the dictionary data buffer 22 into an address (a global bus read address) of the external memory 2 in which a dictionary element corresponding to the predetermined dictionary element address is stored. The bitmap-address converting section 26 converts the predetermined dictionary element address in the dictionary data buffer 22 into an address of the bitmap 23 in which a flag of the dictionary element corresponding to the predetermined dictionary element address is stored.

The dictionary control section 11 also includes an AND circuit 27 that receives, as inputs, a control signal outputted from the bus control FSM 21 and a value of a flag concerning the predetermined dictionary element outputted from the bitmap 23.

An output (a global bus read request) from the AND circuit 27 is inputted to the external memory 2 via the bus 3 together with the global bus read address (a bus request). When the bus request is received, the dictionary element stored in the global bus read address is inputted to the dictionary data buffer 22.

When a read request for a dictionary element is inputted from the recognition operation section 13, the dictionary data buffer 22 outputs the stored predetermined dictionary element to the recognition operation section 13. Note that the recognition operation section 13 outputs the read request to the dictionary data buffer 22 and, at the same time, outputs the read request to the bitmap 23 as well in order to record that the dictionary element is referenced for the image recognition. The bitmap 23 sets a flag corresponding to the read-requested dictionary element to "1".

The input image buffer 12 temporarily stores image data set as a target of the image recognition. The image data is inputted to the input image buffer 12 at predetermined timing from a not-shown external image input apparatus via the bus 3.

The recognition operation section 13 includes a feature-value calculating section 31 and a likelihood calculating section 32. The feature-value calculating section 31 calculates a vector and an amount representing features of an image in an image region (a region of interest, hereinafter referred to as ROI) segmented from the image data stored in the input image buffer 12. The ROI is based on a size of an object desired to be recognized.

The feature-value calculating section 31 calculates, for example, an HOG (histograms of oriented gradients) feature value or a CoHOG (co-occurrence histograms of oriented gradients) feature value. The HOG feature value is obtained by calculating luminance gradient information of respective pixels included in the ROI and accumulating frequencies of luminance gradients with respect to directions of the luminance gradients. The CoHOG feature value is obtained by referencing combination information of directions of luminance gradients of pixels in two places slightly apart from each other and accumulating frequencies of the luminance gradients.

The likelihood calculating section 32 calculates, referencing the feature value calculated by the feature-value calculating section 31 and the dictionary data stored in the dictionary data buffer 22, as likelihood, plausibility that the object included in the ROI is estimated as the object represented by the image data. For example, when a feature value F is configured by n elements (hereinafter referred to as feature value elements) of $\{a_1, a_2, a_3, \ldots, a_{(n-1)}, \text{and } a_n\}$, the likelihood calculating section 32 calculates, referencing dictionary data D configured by n dictionary elements of $\{A_1, A_2, A_3, \ldots, A_{(n-1)}, \text{and } A_n\}$, likelihood L according to an inner product of the feature value F and the dictionary data D (see the following Equation (1)).

$$\text{Likelihood } L = F \cdot D \quad \text{Equation (1)}$$

$$= \begin{pmatrix} a_1 \\ a_2 \\ a_3 \\ \ldots \\ a_{n-1} \\ a_n \end{pmatrix} \cdot (A_1 \quad A_2 \quad A_3 \quad \ldots \quad A_{n-1} \quad A_n)$$

$$= a_1 A_1 + a_2 A_2 + a_3 A_3 + \ldots + a_{(n-1)} A_{(n-1)} + a_n A_n$$

Figure 3:
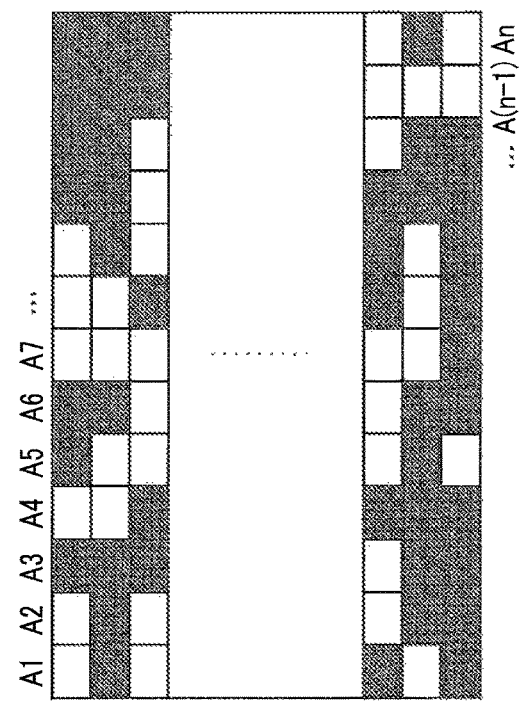
FIG. 3 is a diagram showing an example of a histogram representing a feature value F of an ROI set as an image recognition target.
Figure 4:
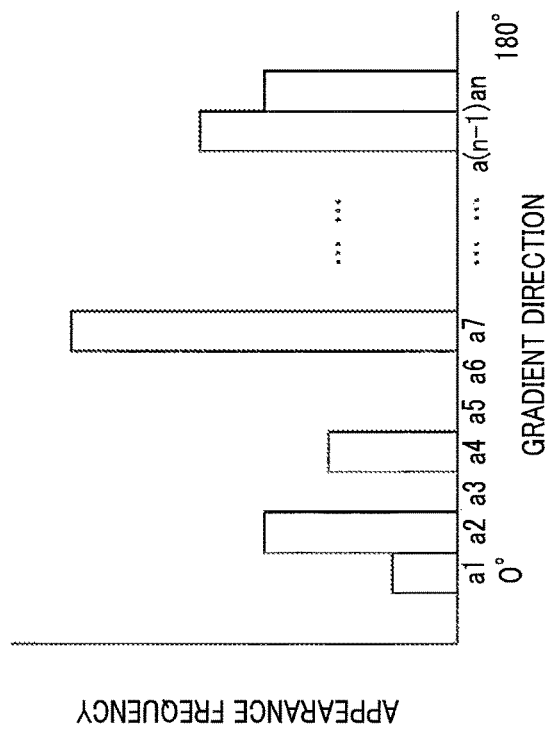
FIG. 4 is a diagram showing an example of a bitmap 23 corresponding to the histogram shown in FIG. 3.

FIG. 3 is a diagram showing an example of a histogram representing the feature value F of the ROI. FIG. 4 is a diagram showing an example of the bitmap 23 corresponding to the histogram shown in FIG. 3. In the feature value F having n dimensions, when feature value elements, an appearance frequency of which is zero, like the feature value elements $a_3$, $a_5$, and $a_6$ shown in FIG. 3 are present, a term including $a_3$, $a_5$, and $a_6$ of Equation (1) is zero. Therefore, a calculation result of the likelihood L is not affected irrespective of what kinds of values the dictionary elements $A_3$, $A_5$, and $A_6$ multiplied with the feature value elements $a_3$, $a_5$, and $a_6$ are. That is, dictionary elements multiplied with feature value elements, an appearance frequency of which is zero, are unnecessary in calculating the likelihood L and are identified as dictionary elements not referenced for the image recognition.

If the feature value F is the same, even if the dictionary data referenced for the calculation of the likelihood L is replaced with other dictionary data, positions of the dictionary elements not referenced for the image recognition are the same. Therefore, by recording positions of the dictionary elements referenced for the image recognition in the bitmap 23, in reading next dictionary data from the external memory 2, it is possible to perform control to read only the dictionary elements referenced for the image recognition into the dictionary data buffer 22 referring to the bitmap 23.

Note that, when a plurality of ROIs are set in the image data stored in the input image buffer 12 and likelihood is calculated referencing a different feature value F for each of the ROIs, feature value elements $a_i$, an appearance frequency of which is zero, are extracted at the feature values F of all the ROIs and positions of dictionary elements $A_i$ corresponding to the feature value elements $a_i$ are recorded in the bitmap 23. Consequently, it is possible to perform control not to read dictionary elements not referenced for the image recognition common to the plurality of ROIs into the dictionary data buffer 22.

In the bitmap 23 shown in FIG. 4, one field corresponds to a 1-bit flag. White fields represent a "1: Referenced for image recognition" state and hatched fields represent a "0: Not referenced for image recognition" state. The bitmap 23 shown in FIG. 4 is an n-bit map in which 1 bit is allocated to each of the dictionary elements. Bits corresponding to the dictionary elements $A_1$, $A_2$, $A_3$, . . . , $A_{(n-1)}$, and $A_n$ are arranged in a row direction in order from upper left to lower right. In the feature value F shown in FIG. 3, since an appearance frequency of the feature value elements $a_3$, $a_5$, $a_6$, and the like is zero, fields of the dictionary elements $A_3$, $A_5$, $A_6$, and the like shown in FIG. 4 are indicated by hatching.

Note that, in the bitmap 23, 1 bit, is allocated to one block of the dictionary data. In an example shown in FIG. 4, one block is one dictionary element (e.g., 2 bytes). However, a size of one block can be optionally set, for example, a unit (e.g., 512 bytes) of a bus read for the bus 3 is set as one block.

In this way, only the dictionary elements actually referenced for the image recognition are read and the dictionary elements not referenced for the image recognition are not read. Consequently, it is possible to reduce time required for acquiring dictionary data from the external memory and improve processing efficiency.

Figure 5:
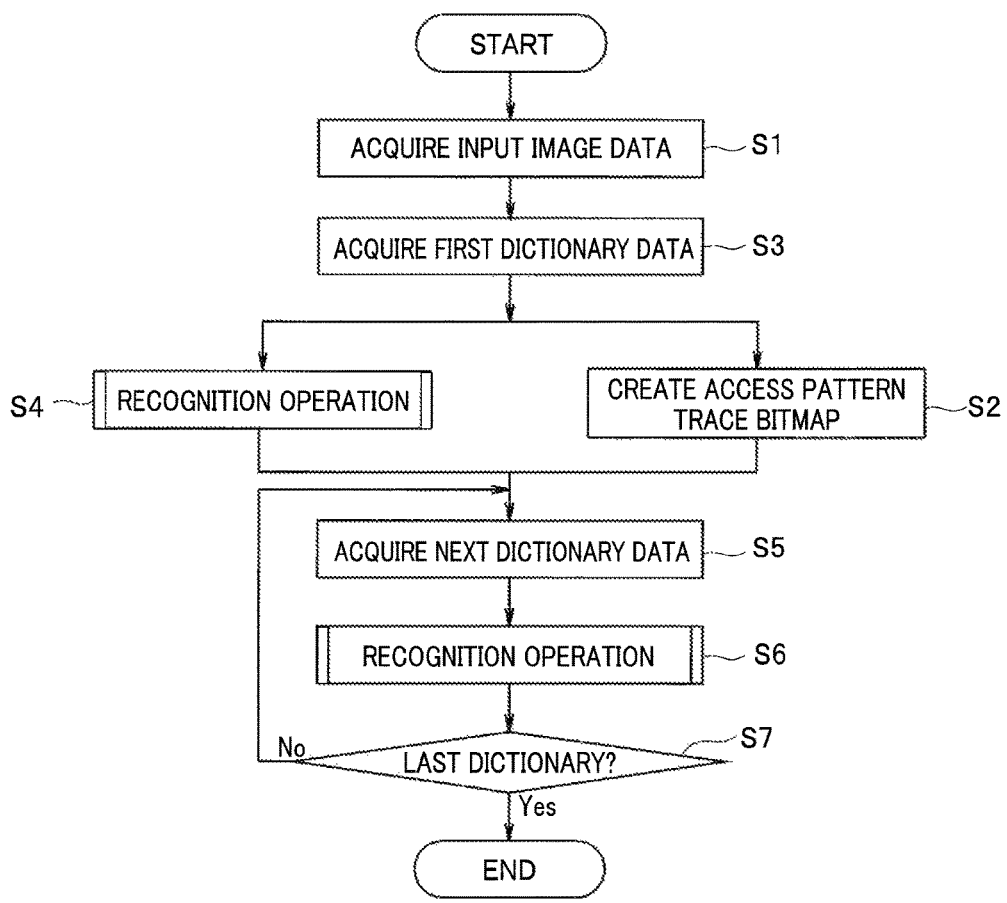
FIG. 5 is a flowchart for explaining an example of a procedure of dictionary data acquisition and a recognition operation in the image recognition apparatus 1.

A flow of dictionary data acquisition and a recognition operation in the image recognition apparatus 1 is explained. FIG. 5 is a flowchart for explaining an example of a procedure of the dictionary data acquisition and the recognition operation in the image recognition apparatus 1.

First, the image recognition apparatus 1 acquires input image data set as an image recognition target (S1). The image recognition apparatus 1 acquires the input image data from an external image input device or the like and stores the input image data in the input image buffer 12. When an ROI set as a target of the image recognition is designated, the image recognition apparatus 1 acquires one dictionary data from the external memory 2 (S3) and performs the recognition operation (S4) referencing the dictionary data and the input image data. Note that, at a point in time of acquisition of first dictionary data, usually, the bitmap 23 is empty (is not created). Therefore, when the dictionary data is acquired in S3, the image recognition apparatus 1 creates the bitmap 23 (S2).

Figure 6:
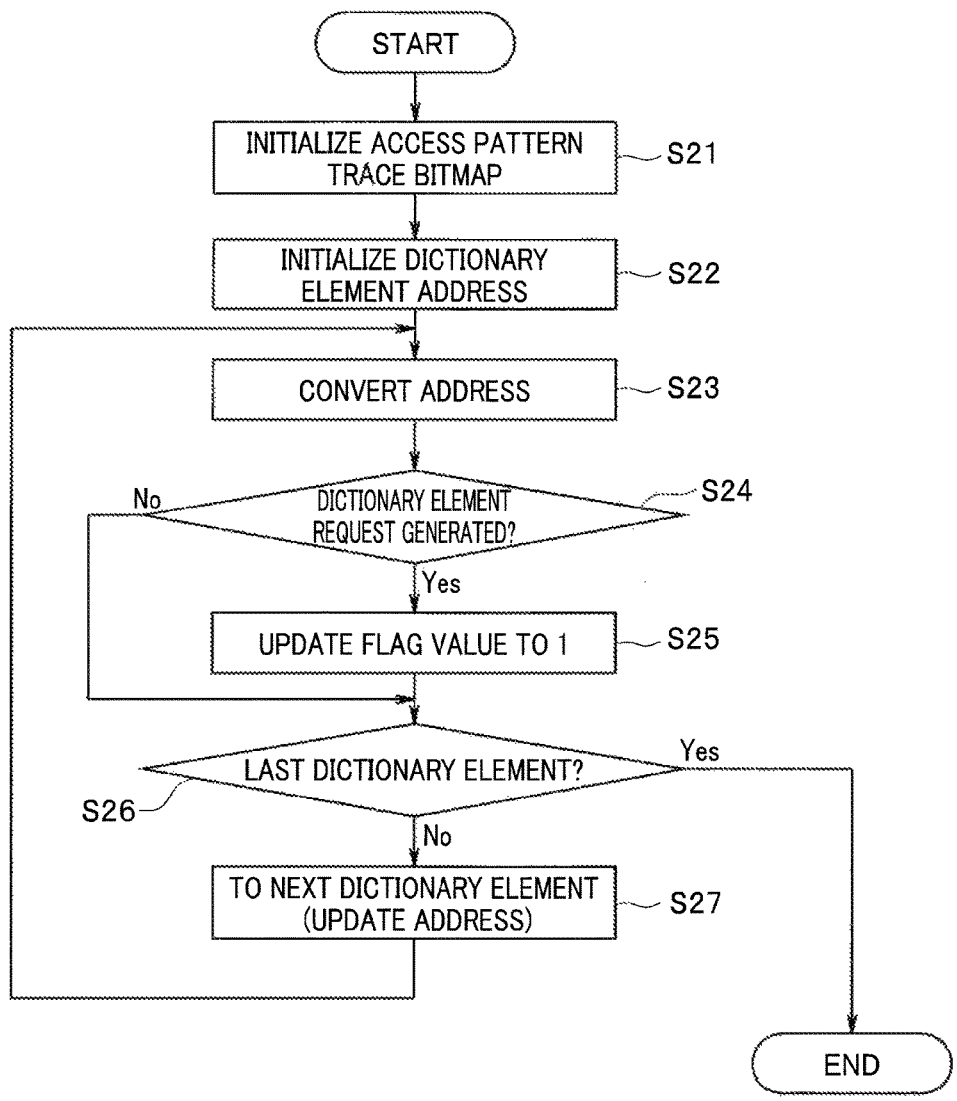
FIG. 6 is a flowchart for explaining a procedure of creation of the bitmap 23.

A procedure for creating the bitmap 23 is explained. FIG. 6 is a flowchart for explaining a procedure of the creation of the bitmap 23. In the following explanation, dictionary elements of the dictionary data are accessed and acquired from a top in order of arrangement.

First, the dictionary control section 11 initializes the bitmap 23 according to control by the bus control FSM 21 (S21). More specifically, the dictionary control section 11 sets flags corresponding to all the dictionary elements to a value "0" indicating that the dictionary elements are not referenced for the recognition operation. Subsequently, the dictionary control section 11 initializes address values of the dictionary elements in the dictionary data (hereinafter referred to as dictionary element addresses) and sets an address of a dictionary element arranged at the top in the dictionary data stored in the dictionary data buffer 22 (S22). Subsequently, the bitmap-address converting section 26 converts the set dictionary element address into an address of a flag in the bitmap 23 corresponding to the dictionary element (S23).

When the dictionary element is necessary for the recognition operation, the recognition operation section 13 inputs a request signal for the dictionary element to the dictionary control section 11. When the request signal for the dictionary element is enabled (Yes in S24), the dictionary control section 11 updates, in the bitmap 23, the flag of the address to a value "1" indicating that the dictionary element is referenced for the recognition operation (S25). On the other hand, when the dictionary element is unnecessary for the recognition operation, that is, when a feature value element multiplied with the dictionary element is zero, the request signal for the dictionary element is disabled (No in S24). In this case, the update of the bitmap 23 is not performed and the process proceeds to the next step.

When the dictionary element is not arranged at an end in the dictionary data (No in S26), the dictionary control section 11 sets the dictionary element address in an address of a dictionary element arranged next to the dictionary element (S27). The dictionary control section 11 repeats the procedure of S23 to S25 and sets a flag for a next dictionary element. On the other hand, when the dictionary element is arranged at the end in the dictionary data (Yes in S26), the dictionary control section 11 ends the creation of the bitmap 23.

Note that, in S26, the dictionary control section 11 determines, for example, on the basis of a dictionary data acquisition end instruction inputted from the recognition operation section 13, whether the dictionary element is arranged at the end of the dictionary data. In the recognition operation section 13, the number and positions of ROIs are set in the read input image prior to the recognition operation. The recognition operation section 13 controls the number and the positions of the ROIs using a counter on the basis of the setting. The recognition operation section 13 counts feature value elements and, at timing when processing of all feature value elements in the set all ROIs is ended for one dictionary data, determines that acquisition of all the feature value elements is ended for the dictionary data. The recognition operation section 13 outputs the dictionary data acquisition end instruction to the dictionary control section 11. When the dictionary data acquisition end instruction is inputted, the dictionary control section 11 determines that the dictionary element is a last.

Figure 7:
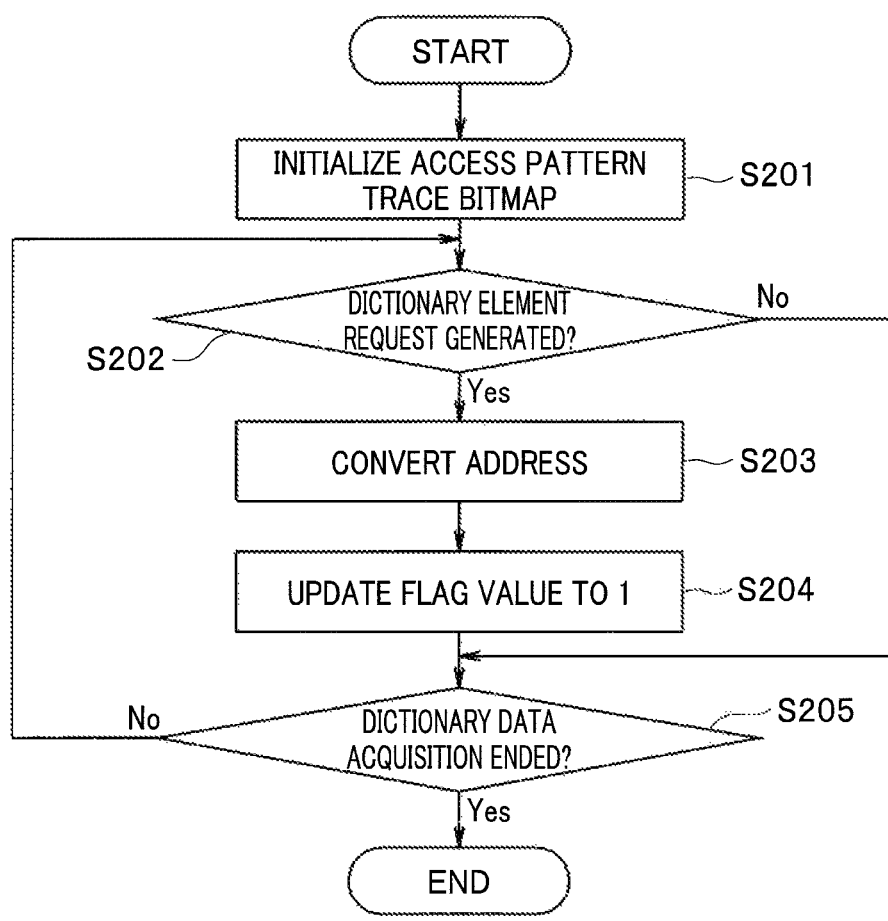
FIG. 7 is a flowchart for explaining a procedure of creation of the bitmap 23.

On the other hand, it is also possible that the dictionary elements arranged in the dictionary data are acquired in random order rather than being acquired from the top in the arrangement order. Rather than calculating a feature value for the entire ROI and then calculating an inner product of the feature value and a dictionary element, for example, every time a feature value is calculated while scanning an input image, an inner product of the feature value and the dictionary element is calculated. That is, when the dictionary elements are acquired in random order, acquisition order of the dictionary element depends on order of feature values calculated while scanning image data. In this case, every time a specific dictionary element is necessary for the recognition operation, the recognition operation section 13 outputs a request signal for dictionary elements and an address of the specific dictionary element to the dictionary control section 11. The dictionary control section 11 monitors the request signal and the dictionary element address and creates the bitmap 23. A procedure for creating the bitmap 23 in parallel to the acquisition of the dictionary data when the dictionary elements are acquired in random order is explained. FIG. 7 is a flowchart for explaining the procedure for creating the bitmap 23.

First, the dictionary control section 11 initializes the bitmap 23 according to control by the bus control FSM 21 (S201). When a request signal for dictionary elements and a dictionary element address are enabled (Yes in S202), the dictionary control section 11 converts, in the bitmap-address converting section 26, the input dictionary element address into an address in the bitmap 23 (S203). Subsequently, the dictionary control section 11 updates a flag of the converted address to "1" (S204). The dictionary control section 11 determines whether acquisition of first dictionary data is ended (S205). On the other hand, after the end of S201, when the dictionary element request is not inputted from the recognition operation section 13 even after waiting until a predetermined condition is satisfied (No in S202), the dictionary control section 11 proceeds to S205 and performs the determination of the dictionary data acquisition end.

The dictionary control section 11 determines, for example, on the basis of a dictionary data acquisition end instruction inputted from the recognition operation section 13, whether the acquisition of the first dictionary data is ended (S205). In the recognition operation section 13, the number and positions of ROIs set as targets of the recognition operation are set in an input image. The recognition operation section 13 controls the number of the ROIs and scan positions in the ROIs using X and Y counters or the like. The recognition operation section 13 determines that the acquisition ends at timing when all feature value elements for one dictionary data are acquired for the last ROI in the input image (e.g., when the image is raster-scanned from the upper left and read, at a point in time when the X and Y counters in the ROIs reach a lower right coordinate position). The recognition operation section 13 outputs the dictionary data acquisition end instruction to the dictionary control section 11. When the dictionary data acquisition end instruction is inputted, the dictionary control section 11 determines that the acquisition of the first dictionary data is ended (Yes in S205) and ends the creation of the bitmap 23. When the dictionary data acquisition end instruction is not inputted, the dictionary control section 11 determines that the acquisition of the first dictionary data is not ended (No in S205), returns to S202, and waits for an input of a dictionary element request from the recognition operation section 13.

Simultaneously with creating the bitmap 23 according to the procedure shown in FIG. 6 or 7, the image recognition apparatus 1 performs the recognition operation for the input image data referencing the acquired dictionary data (S4). The recognition operation section 13 performs the recognition operation, for example, as explained below. First, the feature-value calculating section 31 extracts a pixel located in an ROI set as a target of the recognition operation in the input image data and calculates a feature value of the pixel. The likelihood calculating section 32 calculates an inner product of the calculated feature value and a dictionary element corresponding to the feature value. The likelihood calculating section 32 calculates, concerning all pixels located in the designated ROI, inner products of feature values and dictionary elements corresponding to the feature values. Finally, the recognition operation section 13 outputs a sum of the calculated inner products as likelihood of the dictionary data.

When the recognition operation (S4) and the creation of the bitmap 23 (S2) performed referencing the first dictionary data end, the image recognition apparatus 1 acquires next dictionary data from the external memory 2 (S5). As the dictionary data acquired in S5, the image recognition apparatus 1 acquires only dictionary elements necessary for the recognition operation while referring to the created bitmap 23.

Figure 8:
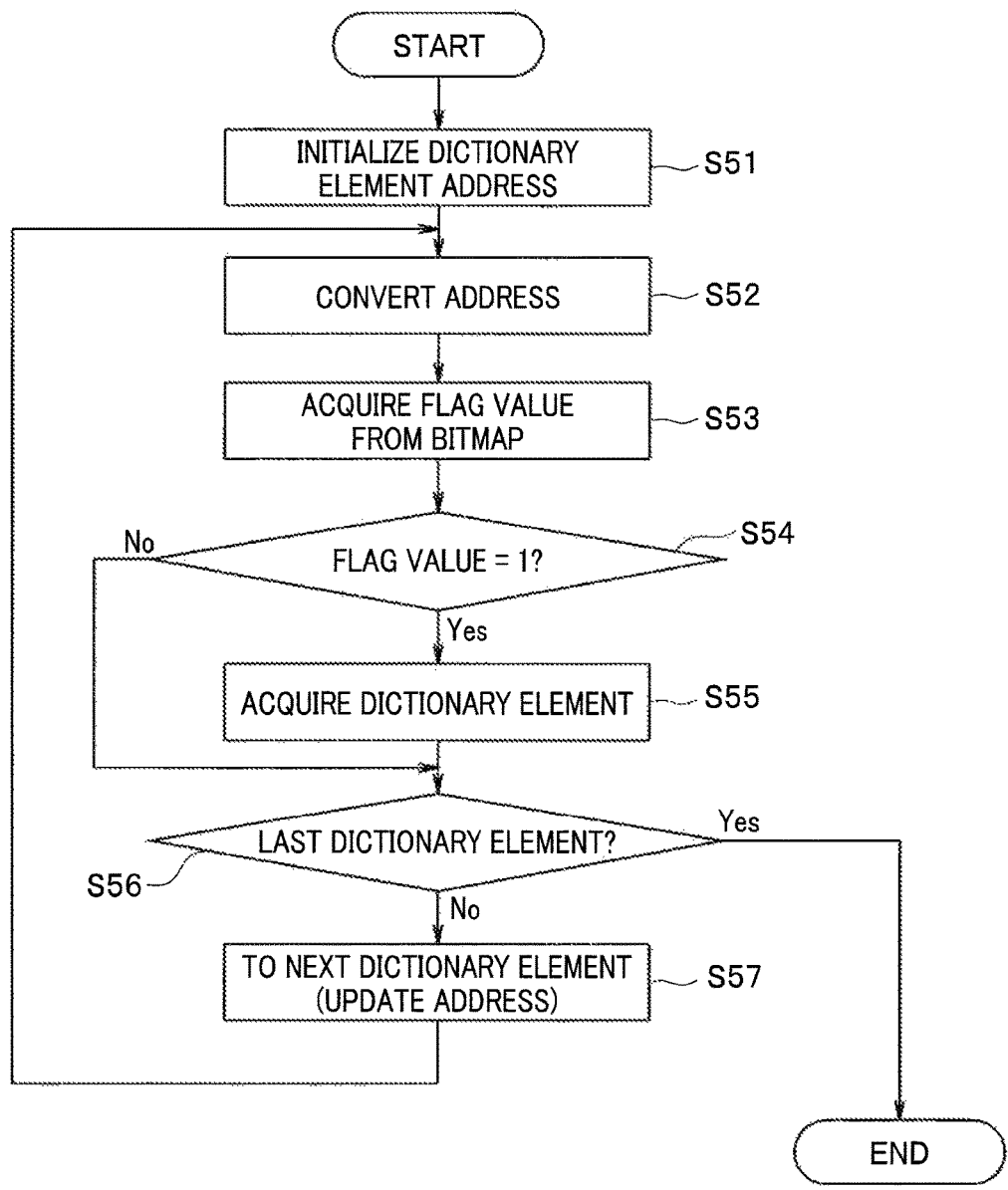
FIG. 8 is a flowchart for explaining a procedure for acquiring dictionary data while referring to the bitmap 23.

A procedure for acquiring dictionary data in S5 is explained. FIG. 8 is a flowchart for explaining a procedure for acquiring dictionary data with reference to the bitmap 23.

First, the dictionary control section 11 initializes a dictionary element address and sets an address in the dictionary data buffer 22 of a dictionary element arranged at a top of dictionary data (S51). Subsequently, the bitmap-address converting section 26 converts the dictionary element address into an address of a flag in the bitmap 23 corresponding to the dictionary element (S52). Subsequently, the bitmap-address converting section 26 acquires a flag value from the bitmap 23 according to the converted address (S53).

When the acquired flag value is "1" (Yes in S54), the AND circuit 27 outputs a global bus read request signal. The global-address converting section 25 converts the dictionary element address into an address of the external memory 2 in which the dictionary element is stored and outputs the address. The bus control FSM 21 acquires, according to the global bus read request signal, a dictionary element corresponding to the converted address from the external memory 2 (S55) and the process proceeds to S56. On the other hand, when the acquired flag value is "0" (No in S54), the AND circuit 27 does not output the global bus read request signal. Therefore, the process proceeds to S56 without the bus control FSM 21 acquiring a dictionary element from the external memory 2 (S55).

Subsequently, the dictionary control section 11 determines whether the dictionary element is a last dictionary element in the dictionary data (S56). When the dictionary element is not the last dictionary element (No in S56), the dictionary control section 11 sets the dictionary element address to an address of a next dictionary element (S57) and repeats the procedure of S52 to S56. On the other hand, when the dictionary element is the last dictionary element in the acquisition target dictionary data (Yes in S56), the dictionary control section 11 ends the acquisition of dictionary data.

In this way, when reading second and subsequent dictionary data, the dictionary control section 11 performs control to read only dictionary elements, flag values of which in the bitmap 23 are "1", and not to read dictionary elements, flag values of which in the bitmap 23 are "0". Consequently, it is possible to reduce a reading amount of dictionary elements. Therefore, it is possible to reduce a reading time and efficiently perform the recognition operation. Further, it is possible to acquire dictionary elements necessary for the recognition operation as in the past without compressing data. Therefore, it is possible to perform the recognition operation without lowering accuracy of likelihood calculated referencing Equation (1).

When the next dictionary data is acquired (S5), the image recognition apparatus 1 proceeds to S6 and performs the recognition operation for an ROI referencing the acquired dictionary data. Note that, when the recognition operation is performed referencing the first dictionary data (S4), a feature value of the ROI is already calculated. Therefore, in the recognition operation in S6, the image recognition apparatus 1 calculates likelihood referencing the calculated feature value and the dictionary data stored in the dictionary data buffer 22.

When the dictionary data acquired in S5 is not last dictionary data referenced for the recognition operation (No in S7), that is, when dictionary data for which the recognition operation is not performed yet is present among a plurality of dictionary data referenced for the recognition operation for the ROI, the image recognition apparatus 1 returns to S5. On the other hand, when the dictionary data acquired in S5 is the last dictionary data referenced for the recognition operation (Yes in S7), that is, when the recognition operation for the ROI is ended referencing all the dictionary data, the image recognition apparatus 1 ends a series of processing of the dictionary data acquisition and the recognition operation.

As explained above, by referencing the image recognition apparatus 1 in the present embodiment, when dictionary data is read from the external memory 2 or the like every time and the recognition operation for an object is performed, it is possible to read only necessary dictionary elements while referring to the bitmap 23 that records whether dictionary elements are dictionary elements necessary for the recognition operation. Consequently, since unnecessary dictionary elements are not read, it is possible to reduce time required for acquiring dictionary data from the external memory and improve processing efficiency of the recognition operation.

Note that a bitmap may be created prior to the acquisition of dictionary data and stored in the external memory 2 or the like. When the bitmap is created in advance, the bitmap can be created in the same manner as the flowchart of FIG. 6 or 7.

Figure 9:
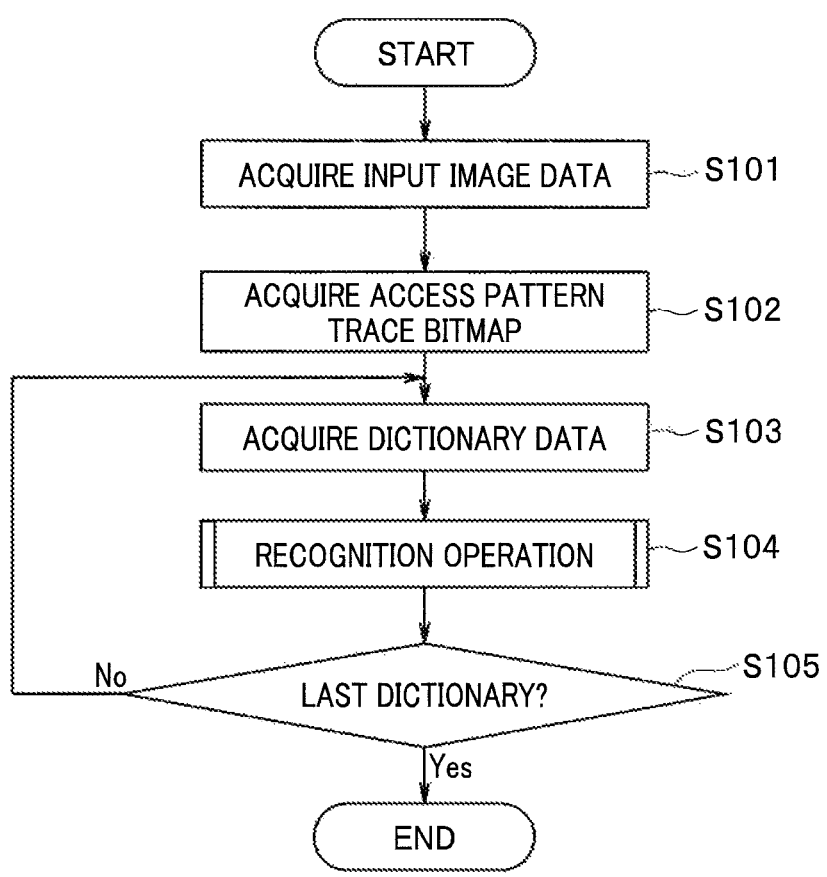
FIG. 9 is a flowchart for explaining an example of a procedure of dictionary data acquisition and a recognition operation performed referencing a bitmap created in advance.

A method of performing the acquisition of dictionary data and the recognition operation referencing the bitmap stored in advance in the external memory 2 or the like is explained. FIG. 9 is a flowchart for explaining an example of a procedure of the dictionary data acquisition and the recognition operation performed referencing the bitmap 23 created in advance.

First, the image recognition apparatus 1 acquires input image data set as an image recognition target (S101). The image recognition apparatus 1 acquires the input image data from an external image input device or the like and stores the input image data in the input image buffer 12. Subsequently, the image recognition apparatus 1 acquires a bitmap stored in the external memory 2 or the like and overwrites the bitmap 23 of the dictionary control section 11 with the bitmap (S102). Subsequently, the image recognition apparatus 1 acquires, from the external memory 2 or the like, first dictionary data referenced for the recognition operation (likelihood calculation) while referring to the bitmap 23 (S103).

In S103, the image recognition apparatus 1 acquires the dictionary data referencing the series of procedures shown in FIG. 8. That is, concerning each of a plurality of dictionary elements configuring the dictionary data, the image recognition apparatus 1 refers to a flag value of the bitmap 23 corresponding to the dictionary element and, when the flag value is "1", acquires the dictionary element from the external memory 2. When the flag value is "0", the image recognition apparatus 1 does not acquire the dictionary element.

Subsequently, the image recognition apparatus 1 performs the recognition operation referencing the acquired dictionary data and the input image data (S104). When the acquired dictionary data is not last dictionary data referenced for the recognition operation (No in S105), the image recognition apparatus 1 returns to S103. That is, when dictionary data for which the recognition operation is not performed yet is present among a plurality of dictionary data, the image recognition apparatus 1 acquires next dictionary data (S103) and performs the recognition operation referencing the dictionary data (S104). On the other hand, when the acquired dictionary data is the last dictionary data referenced for the recognition operation (Yes in S105), the image recognition apparatus 1 ends a series of processing of the dictionary data acquisition and the recognition operation.

As explained above, when the bitmap in which positions of dictionary elements referenced for the recognition operation are recorded is stored in the external memory 2 or the like in advance, by reading the bitmap into the dictionary control section 11 prior to the acquisition of dictionary data, it is possible to read only dictionary elements necessary for the recognition operation from the external memory 2. Consequently, since dictionary elements unnecessary for the recognition operation are not read, it is possible to reduce time required for acquiring dictionary data from the external memory and improve processing efficiency of the recognition operation.

Second Embodiment

In the image recognition apparatus in the first embodiment, the bus control FSM 21 and the bitmap 23 in the dictionary control section 11 are configured by hardware. An image recognition apparatus in the second embodiment is different from the image recognition apparatus in the first embodiment in that the components and various kinds of control are realized by executing a software program on a processor.

Figure 10:
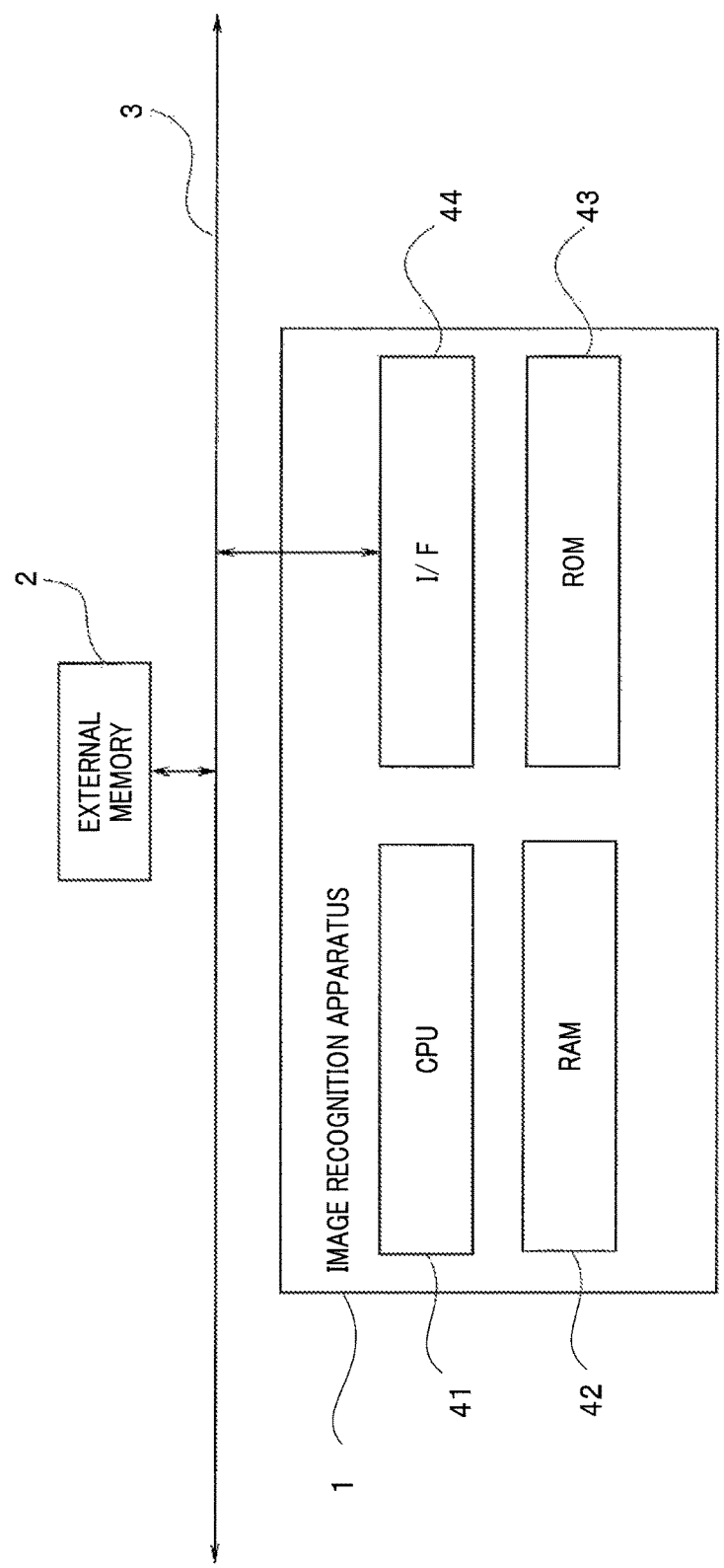
FIG. 10 is a block diagram showing an example of a configuration of an image recognition apparatus 1' according to a second embodiment.

FIG. 10 is a block diagram showing an example of a configuration of an image recognition apparatus 1' according to the second embodiment. As shown in FIG. 10, the image recognition apparatus 1' in the present embodiment includes a CPU 41, a RAM 42, a ROM 43, and an I/F 44.

The CPU 41 executes a control program stored in the RAM 42 or the ROM 43 to thereby perform control of the entire image recognition apparatus F. The control program is executed by the CPU 41 to thereby cause the image recognition apparatus 1' to function as means for executing acquisition of various data such as dictionary data and image data from the outside and a recognition operation. The RAM 42 is a volatile memory and temporarily stores image data inputted from a not-shown external image input device, the control program, and an execution result of the control program. The ROM 43 is a nonvolatile memory and stores the control program and various parameters.

That is, the dictionary data buffer 22 and the input image buffer 12 in the first embodiment are equivalent to the RAM 42 in the second embodiment. Control functions of the bus control FSM 21 and the like of the dictionary control section 11 and the recognition operation section 13 in the first embodiment are equivalent to the control program stored in the ROM 43 in the second embodiment. Note that the bitmap 23 in the first embodiment may be stored in the RAM 42 or may be stored in a not-shown cache memory, which is a general-purpose memory resource on the CPU 41. The bitmap 23 may be stored in the external memory 2 and acquired via the bus 3 according to necessity.

By executing the control program of the image recognition apparatus 1' configured as explained above, procedures same as the acquisition of dictionary data and the recognition operation explained in the first embodiment are executed. Therefore, when dictionary data is read from the external memory 2 or the like every time and the recognition operation for an object is performed, it is possible to read only dictionary elements necessary for the recognition operation while referring to the bitmap 23 in which the dictionary elements necessary for the recognition operation are recorded. Consequently, since dictionary elements unnecessary for the recognition operation are not read, it is possible to reduce time required for acquiring dictionary data from the external memory and improve processing efficiency of the recognition operation. Further, an inner production operation is not performed for an item, a flag value of which is "0". Therefore, it is also possible to reduce a processing time.

The respective "sections" in this specification are conceptual sections corresponding to the respective functions of the embodiments. Therefore, the "sections" do not always correspond to specific hardware and software routines in a one-to-one relation. Therefore, in this specification, the embodiments are explained assuming imaginary circuit blocks (sections) including the respective functions of the embodiments.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. An image recognition apparatus comprising:
a recognition operation section implemented by one or more hardware processors, the one or more hardware processors further configured to, when one or a plurality of feature value elements exceeding a set value indicating an appearance frequency appear, transmit a read request of one or a plurality of dictionary elements corresponding to the one or plurality of feature value elements to a dictionary control section and acquire the one or plurality of dictionary elements from the dictionary control section,
the recognition operation section comprising:
a feature-value calculating section configured to calculate a feature value in a region of interest segmented from an image, the feature value including the plurality of feature value elements; and
a likelihood calculating section configured to calculate likelihood of an object present in the region of interest referencing the feature value including the plurality of feature value elements and dictionary data including a plurality of dictionary elements corresponding respectively to the plurality of dictionary elements; and
the dictionary control section implemented by the one or more hardware processors, the one or more hardware processors further configured to record the read request in the discrimination data, and on the basis of the discrimination data, configured to acquire the dictionary element for which the read request is recorded and not to acquire the dictionary element for which the read request is not recorded.

2. The image recognition apparatus according to claim 1, wherein
the discrimination data is a bitmap, and
the dictionary control section includes a bitmap-address converting section configured to convert an address of a storage destination of the acquired dictionary element into an address of the bitmap.

3. The image recognition apparatus according to claim 2, wherein the set value is zero.

4. The image recognition apparatus according to claim 1, wherein the dictionary control section creates the discrimination data.

5. The image recognition apparatus according to claim 4, wherein the discrimination data is a bitmap.

6. The image recognition apparatus according to claim 5, wherein the set value is zero.

7. The image recognition apparatus according to claim 4, wherein
the likelihood calculating section calculates, referencing each of a plurality of the dictionary data and the feature value, for each of the dictionary data, the likelihood of the object present in the region of interest, and
the dictionary control section creates the discrimination data when acquiring the dictionary data referenced first for the calculation of the likelihood.

8. The image recognition apparatus according to claim 7, wherein the discrimination data is a bitmap.

9. An image recognition system comprising:
a memory configured to store dictionary data;
an image recognition apparatus implemented by one or more hardware processors; and
a bus configured to connect the image recognition apparatus and the memory, wherein
the image recognition apparatus includes:
a recognition operation section implemented by one or more hardware processors, the one or more hardware processors further configured to, when one or a plurality of feature value elements exceeding a set value indicating an appearance frequency appear, transmit a read request of one or a plurality of dictionary elements corresponding to the one or plurality of feature value elements to a dictionary control section and acquire the one or plurality of dictionary elements from the dictionary control section,
the recognition operation section comprising:
a feature-value calculating section configured to calculate a feature value in a region of interest segmented from an image, the feature value including the plurality of feature value elements; and
a likelihood calculating section configured to calculate likelihood of an object present in the region of interest referencing the feature value including the plurality of feature value elements and dictionary data including the plurality of dictionary elements corresponding respectively to the plurality of dictionary elements; and
the dictionary control section implemented by the one or more hardware processors and configured to record the read request in the discrimination data, and on the basis of the discrimination data, configured to acquire, from the memory, the dictionary element for which the read request is recorded and not to acquire, from the memory, the dictionary element for which the read request is not recorded.

10. The image recognition system according to claim 9, wherein
the discrimination data is a bitmap, and
the dictionary control section includes a bitmap-address converting section configured to convert an address of a storage destination of the acquired dictionary element into an address of the bitmap.

11. The image recognition system according to claim 10, wherein the set value is zero.

12. The image recognition system according to claim 9, wherein
the discrimination data is stored in the memory, and
the dictionary control section acquires the dictionary data from the memory before acquiring the dictionary element from the memory.

13. The image recognition system according to claim 9, wherein the dictionary control section creates the discrimination data.

14. The image recognition system according to claim 13, wherein the discrimination data is a bitmap.

15. The image recognition system according to claim 14, wherein the set value is zero.

16. An image recognition method comprising:
calculating, by a recognition operation section, a feature value in a region of interest segmented from an image, the feature value including the plurality of feature value elements;
transmitting, by the recognition operation section, when the plurality of feature value elements exceeding a set value indicating an appearance frequency appear, a read request of dictionary elements corresponding to the plurality of feature value elements to a dictionary control section and acquiring the dictionary elements from the dictionary control section,
calculating, by thy recognition operation section, likelihood of an object present in the region of interest referencing the plurality of feature value elements and the dictionary elements corresponding to the plurality of feature elements; and
recording, by the dictionary control section, the read request in discrimination data and on the basis of the discrimination data, acquiring, from the memory, the dictionary element for which the read request is recorded and not acquiring, from the memory, the dictionary element for which the read request is not recorded.

17. The image recognition method according to claim 16, wherein the discrimination data is created when the dictionary data referenced first for the calculation of the likelihood is acquired.

* * * * *